United States Patent [19]

Starai

[11] 4,422,026
[45] Dec. 20, 1983

[54] SERVO CONTROL ARRANGEMENT UTILIZING ALTERNATELY ENERGIZED LIGHT SOURCES AND A SINGLE PHOTODETECTOR

[75] Inventor: Rudolph Starai, Arlington Heights, Ill.

[73] Assignee: Bell & Howell Company, Chicago, Ill.

[21] Appl. No.: 336,469

[22] Filed: Dec. 31, 1981

[51] Int. Cl.³ .............................................. G05B 1/06
[52] U.S. Cl. ................................... 318/640; 318/480; 250/231 SE
[58] Field of Search .............................. 318/640, 480; 250/231 SE; 353/26 A

[56] References Cited

U.S. PATENT DOCUMENTS

| | | | |
|---|---|---|---|
| 3,843,915 | 10/1974 | Helmbold | 318/640 X |
| 3,886,562 | 5/1975 | Atzinger et al. | 318/640 X |
| 4,187,456 | 2/1980 | von der Heide | 318/640 X |
| 4,202,549 | 5/1980 | Takeuchi | 318/640 X |
| 4,215,301 | 7/1980 | Mason | 318/640 X |
| 4,334,222 | 6/1982 | Kelley | 250/231 SE |

Primary Examiner—B. Dobeck
Attorney, Agent, or Firm—James V. Lapacek; Robert J. Schneider; Roger M. Fitz-Gerald

[57] ABSTRACT

A servo control arrangement is provided that accurately controls the positioning of a movable member. The movable member is controlled by a motor through a drive train. A coded member is carried either by the drive train or the controlled movable member so as to move in accordance with the controlled movable member. The coded member includes an array of apertures with each of the apertures corresponding to a controlled position of the controlled movable member. In a preferred arrangement, the controlled movable member is a rotary turntable that carries a slide tray for projection apparatus. In that arrangement, each of the apertures corresponds to one of the slide positions of the rotary turntable and slide tray. Feedback information representing the position of the coded member is provided by alternately energized light sources and a single photodetector device. The light sources are disposed on one side of the coded member and the single photodetector is disposed on the opposite side of the coded member such that light from the illumination sources passes through each aperture of the coded member and impinges upon the photodetector device as each aperture moves to within a predetermined positional range of a detecting station formed at the point of alignment of the illumination sources and the photodetector. The output of the photodetector represents the illumination received by the photodetector during the energized time of each respective illumination source. Thus, the output of the photodetector provides differential position feedback signals during the respective energized time period of the illumination sources; the differential position feedback signals being utilized to control operation of the motor.

16 Claims, 4 Drawing Figures

SERVO CONTROL ARRANGEMENT UTILIZING ALTERNATELY ENERGIZED LIGHT SOURCES AND A SINGLE PHOTODETECTOR

BACKGROUND OF THE INVENTION

A. Field of the Invention

The present invention relates generally to the field of servo control and more particularly to a servo control arrangement utilizing alternately energized light sources and a single photodetector to accurately detect the position of a coded aperture member movable with a controlled member and to provide feedback control signals for controlling the position of the controlled member.

B. Description of the Prior Art

Various control apparatus are known for slide projectors to control the positioning of a slide tray to a slide position. Control arrangements of this type are disclosed in U.S. Pat. Nos. 3,296,727, 3,225,652, 3,299,554, 3,895,864, 3,907,414, 3,924,942, 4,041,457, 3,644,027, 3,510,215, 3,733,122, 3,652,155, 3,623,803, 3,700,320 and 3,732,546.

In U.S. Pat. Nos. 3,907,414, and 3,895,864, the slide position of the slide tray is detected by the use of an optically coded disc 24 with absolute position address and coding provided by six concentric optically coded rings. The disc also includes optically coded stop control portions on an outer concentric ring with one opitcal transparent portion for each slide portion of the linear tray array.

U.S. Pat. No. 4,041,457 discloses the positioning of slides by a digitally controlled servo motor; the servo motor being controlled by the output of a comparator.

While the above-described control arrangements of the prior art are generally suitable for their intended use, it would be desirable to more accurately control the positioning of a movable member to one of a plurality of positions.

SUMMARY OF THE INVENTION

Accordingly, it is a principal object of the present invention to provide a servo control arrangement for accurately positioning a controlled member utilizing alternately energized light sources and a single photodetector to provide positional feedback signals derived from light passing through a coded aperture member carried by the movable member.

It is another object of the present invention to provide a positional feedback circuit that develops differential feedback signals by the provision of alternately energized illumination sources disposed opposite a single photodetector with a movable coded aperture member placed intermediate the light source and the photodetector, the output of the photodetector providing differential feeback signals during time periods corresponding to the respective energization of the light sources.

Briefly, these and other objects of the present invention are achieved by providing a servo control arrangement that accurately controls the positioning of a movable member. The movable member is controlled by a motor through a drive train. A coded member is carried either by the drain train or the controlled movable member so as to move in accordance with the controlled movable member. The coded member includes an array of apertures with each of the apertures corresponding to a controlled position of the controlled movable member. In a preferred arrangement, the controlled movable member is a rotary turntable that carries a slide tray for projection apparatus. In that arrangement, each of the apertures corresponds to one of the slide positions of the rotary turntable and slide tray. Feedback information representing the position of the coded member is provided by alternately energized light sources and a single photodetector device. The light sources are disposed on one side of the coded member and the single photodetector is disposed on the opposite side of the coded member such that light from the illumination sources passes through each aperture of the coded member and impinges upon the photodetector device as each aperture moves to within a predetermined positional range of a detecting station formed at the point of alignment of the illumination sources and the photodetector. The output of the photodetector represents the illumination received by the photodetector during the energized time of each respective illumination source. Thus, the output of the photodetector provides differential position feedback signals during the respective energized time period of the illumination source; the differential position feedback signals being utilized to control operation of the motor.

The invention both as to its organization and method of operation together with further objects and advantages thereof will best be understood with reference to the following specification taken in conjunction with the accompanying drawings.

DETAILED DESCRIPTION OF THE PREFERRED EMBODIMENT

Figure 1:
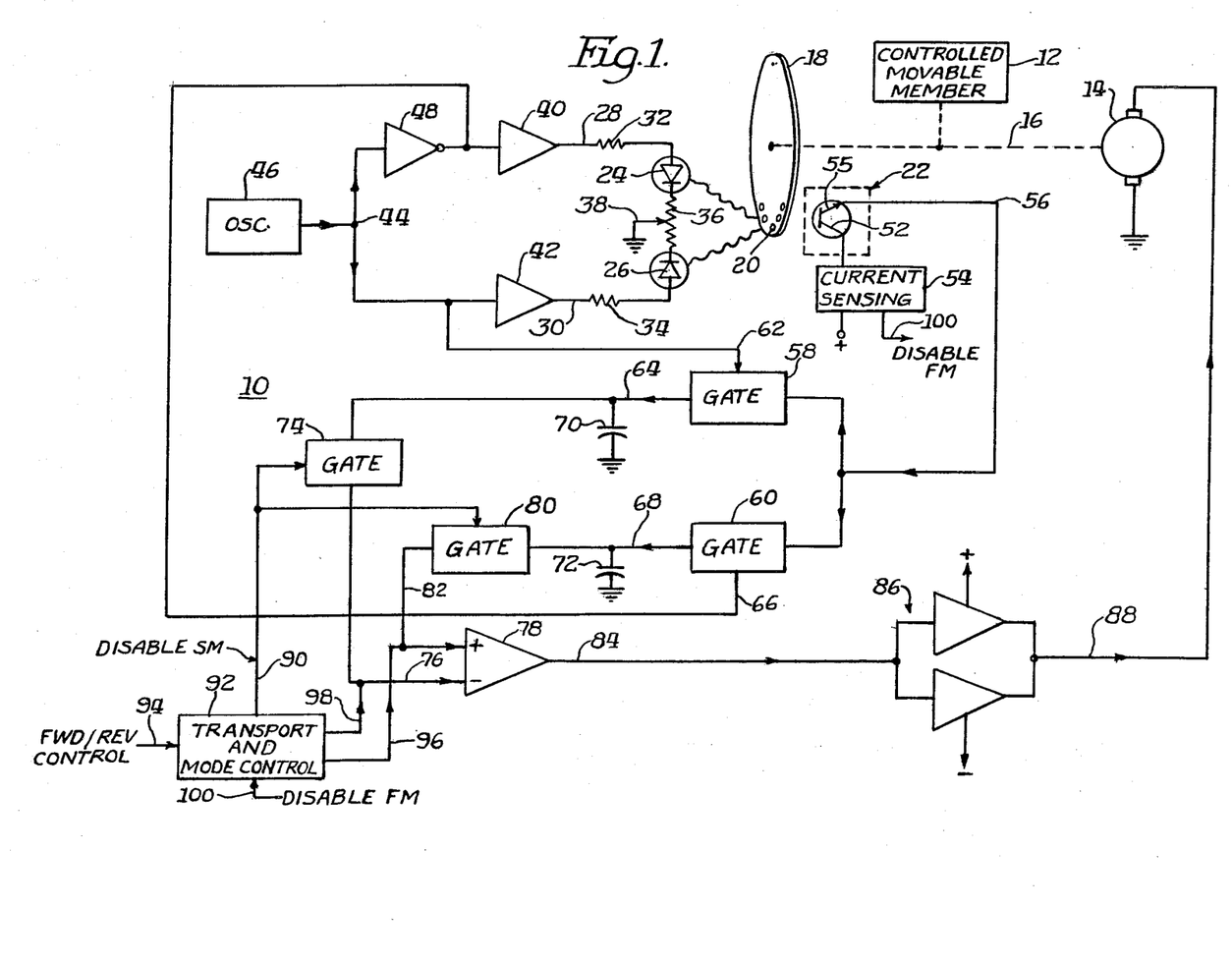
FIG. 1 is a block diagram and logic diagram representation of a servo control arrangement in accordance with the principles of the present invention.

Referring now to FIG. 1, the servo control arrangement 10 of the present invention is arranged to accurately control the positioning of a controlled movable member shown generally at 12 by means of a motor 14 and associated drive train referred to generally at 16. The servo control arrangement 10 includes a coded aperture member 18 that is arranged to move either directly with the controlled movable member 12 or with the drive train 16 of the motor 14.

In the case where the controlled movable member 12 is a rotary element, for example, a rotary slide tray turntable carrying a slide tray on a slide projector, the coded aperture member 18 is a rotary disc or circumferential ring that is rotated either directly in accordance with the rotary motion of the rotary member 12 or in direct proportion thereto. For simplicity in considering the preferred embodiment of the servo control arrangement 10 of the present invention, a rotary movable member 12 and a rotary coded aperture member 18 will be discussed. However, it should be understood that the present invention is equally applicable to coded members 18 and controlled members 12 of other shapes such as to define for example a linear array of apertures 20 and a linear field of controlled positions.

The coded aperture member 18 includes an array of apertures 20 disposed about a circumferential path of the member 18 with one of the apertures 20 corresponding to each desired rotary position to which the member 12 is controlled. Thus, for the control of a slide tray in a slide projector, the coded member 18 includes an aperture 20 in the array corresponding to each of the slide positions of the slide tray.

The servo control arrangement 10 includes a photodetector device 22 positioned on one side of the coded member 18 and two alternately energized illumination sources 24, 26 arranged on the opposite side of the coded member 18. The illumination sources 24, 26 and the photodetector 22 are disposed in a predetermined relationship about the coded member 18 such that a line generally perpendicular to the coded member 18 passes through the center of the photodetector 22, the path of travel formed by the array of apertures 20 and the center point of the two illumination sources 24, 26.

Thus, when an aperture 20 is aligned with the center point of the two sources 24, 26, the photodetector device 22 will receive equal illumination from the sources 24, 26 resulting in a substantially continuous input of light energy having a substantially constant amplitude. Further, the predetermined relationship of the sources 24, 26, the apertures 20 and the photodetector device 22 results in unequal illumination received by the photodetector device 22 from each of the sources 24, 26 when an aperture 20 is within a predetermined positional range about either side of the central aligned position. The output of the photodetector device 22 is utilized by the servo control arrangement 10 as a positional feedback signal to determine appropriate drive signals in a servo control mode to control appropriate rotation of the motor 14 to accurately position the controlled member 12.

Each of the illumination sources 24, 26 receives a respective drive energizing signal 28, 30 through a respective series drive resistor 32, 34. In a specific embodiment the illumination sources 24, 26 are LED devices receiving their respective drive signals at their anode connections. The cathode of the LED device 24, 26 are interconnected by a potentiometer 36. A movable wiper arm 38 of the potentiometer 36 is connected to ground potential with adjustment of the wiper arm 38 providing a balance of drive signals to the LED device 24, 26.

The drive signals 28, 30 to the sources 24, 26 are respectively provided at the outputs of buffer stages 40, 42. The input of the buffer stage is connected to the output 44 of an oscillator stage 46. The output 44 of the oscillator 46 is connected through an inverter gate 48 to the input of the buffer stage 40. Thus, the drive signals at 28, 30 are 180° out of phase and thus provide alternate energizing of the sources 24, 26.

In a specific embodiment the photodetector device 22 is a phototransistor that includes a base region positioned to receive illumination passing through the apertures 20. The phototransistor includes a collector lead 52 that is connected to a positive supply voltage through a current sensing stage 54. The emitter 55 of the phototransistor provides a feedback signal output 56 to the input of each of two analog gate stages 58 and 60.

The gate stage 58 includes a gate enable input signal 62 connected to the oscillator output 44. When the gate enable stage 62 is at a high logic level, the gate stage 58 is enabled to provide the feedback signal 56 at the output 64 of the gate stage 58. Thus, the gate stage 58 is enabled coincident with the energizing of the LED illumination source 26. Thus the output 64 of the gate stage 58 represents the response of the phototransistor 22 to the illumination received from the light source 26 through the aperture 20.

The gate stage 60 includes a gate enable signal input 66 supplied from the output of the inverter gate 48. The gate stage 60 includes an output 68 that represents the response of the photodetector 22 during the time that the LED source 24 is energized. The output 64 at the gate stage 58 is connected to ground potential through a sample and hold capacitor 70. Similarly, the output 68 of the gate stage 60 is connected to ground potential through a sample and hold capacitor 72. The output 64 of the gate stage 58 is connected through an analog gate stage 74 whose purpose will be explained in detail hereinafter. The output 76 of the gate stage 74 is connected to the inverting input of a differential amplifier 78. Similarly, the output 68 of the gate stage 60 is connected to an analog gate stage 80. The output 82 of the gate stage 80 is connected to the noninverting input of the differential amplifier 78.

The output 84 of the differential amplifier 78 is connected through a motor drive amplifier stage 86 to provide a drive signal output 88 to the motor 14. The motor drive amp stage 86 is supplied from a positive and a negative supply voltage referenced to a ground potential. Thus at drive signal output 88, an appropriate signal is provided that includes a range of output voltage plus or minus with respect to ground potential to obtain appropriate forward or reverse rotation of the motor 14.

The gates 74 and 80 include a disable servo mode input signal 90. When the disable servo mode signal is a low logic level corresponding to servo mode operation, the gate stages 74 and 80 are enabled to provide the respective input signals 64, 68 at the respective outputs 76, 82. When the disable servo mode signal 90 is a high level, the gates 74 and 80 are disabled and produce no outputs at 76 and 82.

The disable servo mode signal 90 is generated by a transport and mode control stage 92. The transport and mode control stage 92 is responsive to forward/reverse control signal input 94. The forward/reverse control signal input 94 when active conditions the transport mode control stage 92 to provide a high level on the disable servo mode output 90. The forward/reverse control input 94 is active when a positional change of the controlled movable member 12 is desired.

For example, when the rotation of a slide tray is being controlled by the servo control arrangement 10, the foward/reverse control input 94 is active when a rotation of the slide tray carried by the member 12 is desired to move from one slide position to another slide position. In response to a first signal level at input 94 corresponding to a forward movement, the transport and mode control stage 92 provides a positive output at 96 connected to the noninverting input of the differential amplfier 78. Similarly, the control input 94 provides a second level input signal corresponding to a reverse movement to which the transport and mode control stage 92 responds by providing at output 98 a reverse movement signal connected to the inverting input of the differential amplifier 78.

Thus, in operation, the normal state is with the controlled member 12 positioned at one of the plurality of predetermined positions and with the coded member 18 in a corresponding position with the respective aperture 20 in a central aligned position such that equal illumination is received by the photodetector 22 from each of the light sources 24, 26 during their respective energized periods. When a forward or reverse signal level is received at input 94 corresponding to a desired forward or reverse motion of the control member 12 to another predetermined position, the transport and mode control stage 92 functions in a forced mode to disable the servo mode of operation and to provide via output 96 or output 98 a motor control signal at 88 to cause the motor 14 to begin rotation of the controlled member 12 toward another predetermined position.

If the forward/reverse control input at 94 is maintained at a high level as the controlled member 12 moves through more than one predetermined position corresponding to a rapid search or random access mode of operation of a slide projector for example, the servo mode obtained from the output of the photodetector 22 remains disabled and the slide tray carried by the controlled member 12 moves through a desired plurality of positions.

On the other hand, if a movement between two successive predetermined positions is desired, the forward-/reverse control signal 94 is a short duration signal which is appropriately timed of proper duration to correspond to movement of the controlled member 12 through less than the distance between two successive predetermined positions.

In either case, when the forward/reverse control signal input at 94 is terminated, as the next successive aperture 20 enters the predetermined positional range about the central aligned position, the photodetector 22 begins to receive illumination through the aperture 20 from one or the other of the sources 24, 26. As the photodetector 22 begins to conduct in response to received illumination, the current sensing stage 54 senses the current of the conducting photodetector 22. In response to the conduction current of the photodetector 22, the current sensing stage 54 provides a disable forced mode signal at output 100. The disable forced mode signal 100 is connected to the transport and mode control stage 92 to provide termination of one of the respective signals 96, 98 and also provides a low logic level at the disable servo mode output 90 to allow operation of the gates 74, 80 to enable servo operation.

In the servo mode of operation, the feedback signal 56 from the photodetector 22 is gated by the gating stages 58, 60 to provide the differential feedback signal inputs 76, 82 to the differential amplifier 78. Thus, servo mode operation continues to drive the motor 14 to a position wherein the aperture 20 is moved to and stopped at the central aligned position wherein the photodetector 22 receives equal illumination from each of the light sources 24, 26 during the respective energized periods.

When the aperture 20 is in a central aligned position, the signals at 64 and 68 across the respective capacitors 70, 72 are equal and thus the differential amplifier 78 receives equal inputs and provides no output at 84. Thus the motor 14 is stopped with the controlled movable member 12 in a predetermined position corresponding to the aperture 20 at the centrally aligned position.

When the aperture 20 is slightly displaced from the centrally aligned position, the photodetector device 22 will receive unequal illumination from the light sources 24, 26 during their respective energized periods. Thus, the signal at 56 will comprise a square wave rather than a continuous output level as obtained in the balanced or centrally aligned position. Thus, one of the capacitors 70, 72 at respective signal points 64, 68 will be charged to a greater level than the other capacitor. Thus the differential amplifier 78 will receive unequal inputs and cause the motor 14 to move the controlled member 12 and the coded aperture member 18 until the photodetector receives equal illumination from the light sources 24, 26.

The frequency of operation of oscillator stage 46 is chosen to be at a high enough rate for alternate energization of the sources 24, 26 to supply an appropriate number of signals to the photodetector device 22 corresponding to the rotational speed of the coded disc 18 and the spacing of the apertures 20 as well as the size of the apertures 20. For example, for suitable slide projection operation utilizing either 80 or 140 slide position trays, a frequency of operation in the 1 to 5 Khz range has been found suitable but should not be considered in any limiting sense. Reference may be made to copending application Ser. No. 336,523 filed by R. Parker et al on Dec. 31, 1981 for a more detailed discussion of the structure and operation of the coded member 18 and the use of a servo control mechanism for operation with a slide projector.

Considering an alternate to the current sensing stage 54 to produce the disable forced model output 100, the output 56 of the photodetector 22 in a specific embodiment is utilized directly as the disable forced mode signal 100.

Figure 2:
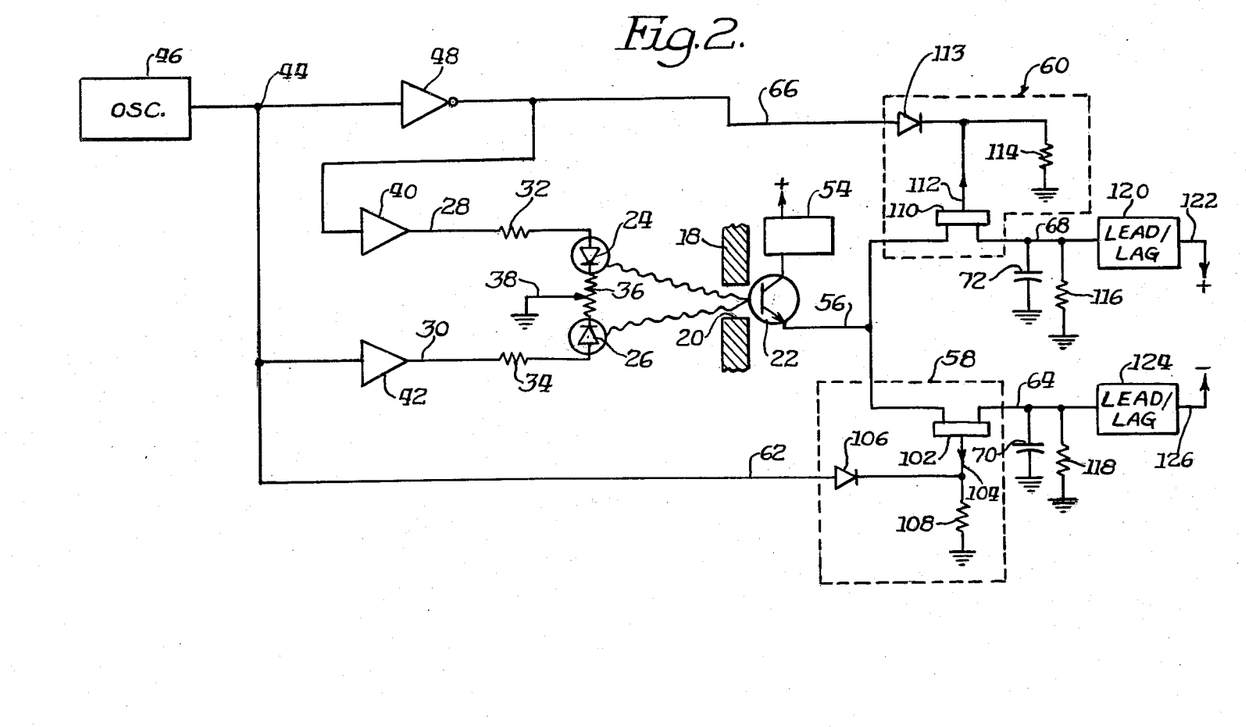
FIG. 2 is an electrical schematic and block diagram representation of portions of the servo control arrangement of FIG. 1 and illustrating one embodiment of the circuit of FIG. 1.

Referring now to FIG. 2 wherein like reference numerals refer to like components and elements of FIG. 1, portions of the servo control arrangement 10 of FIG. 1 are illustrated in one specific embodiment of the servo control arrangement. Specifically, the gate stage 58 includes a FET switch 102 having a drain to source control conduction path interconnected between the photoconductor output 56 and the gate output 64. The gate lead 104 of the FET switch 102 is connected through a diode 106 cathode to anode to the gate enable signal 62. The gate lead 104 is also connected to ground potential through a resistor 108. Similarly, the gate stage 60 includes a FET switch 110 having a drain to source control conduction path interconnected between the photoconductor output 56 and the gate output 68. The gate lead 112 of the FET switch 110 is connected through a diode arranged cathode to anode to the gate enable signal 66. The gate lead 112 is also connected to ground potential through a resistor 114. The gate output 68 is connected to ground potential through a resistor 116 arranged in parallel with the capacitor 72. Similarly, the output 64 of the gate stage 58 is connected to ground potential through a resistor 118 in parallel with the capacitor 70.

For appropriate loop filtering considerations in the servo loop, the output 68 of the gating stage 60 is connected through a lead/lag network or loop filter 120 to provide a modified loop signal 122. Similarly, the output 64 of the gating stage 58 is connected through a lead lag or loop filter stage 124 to provide a modified loop control signal 126. The modified loop control signals 122, 126 are connected to the respective inputs of the differential amplifier 78 by means of suitable analog gating circuits such as the respective gate stages 80, 74 of FIG. 1. Operation of the embodiment of FIG. 2 is substantially similar to that of FIG. 1.

Figure 3:
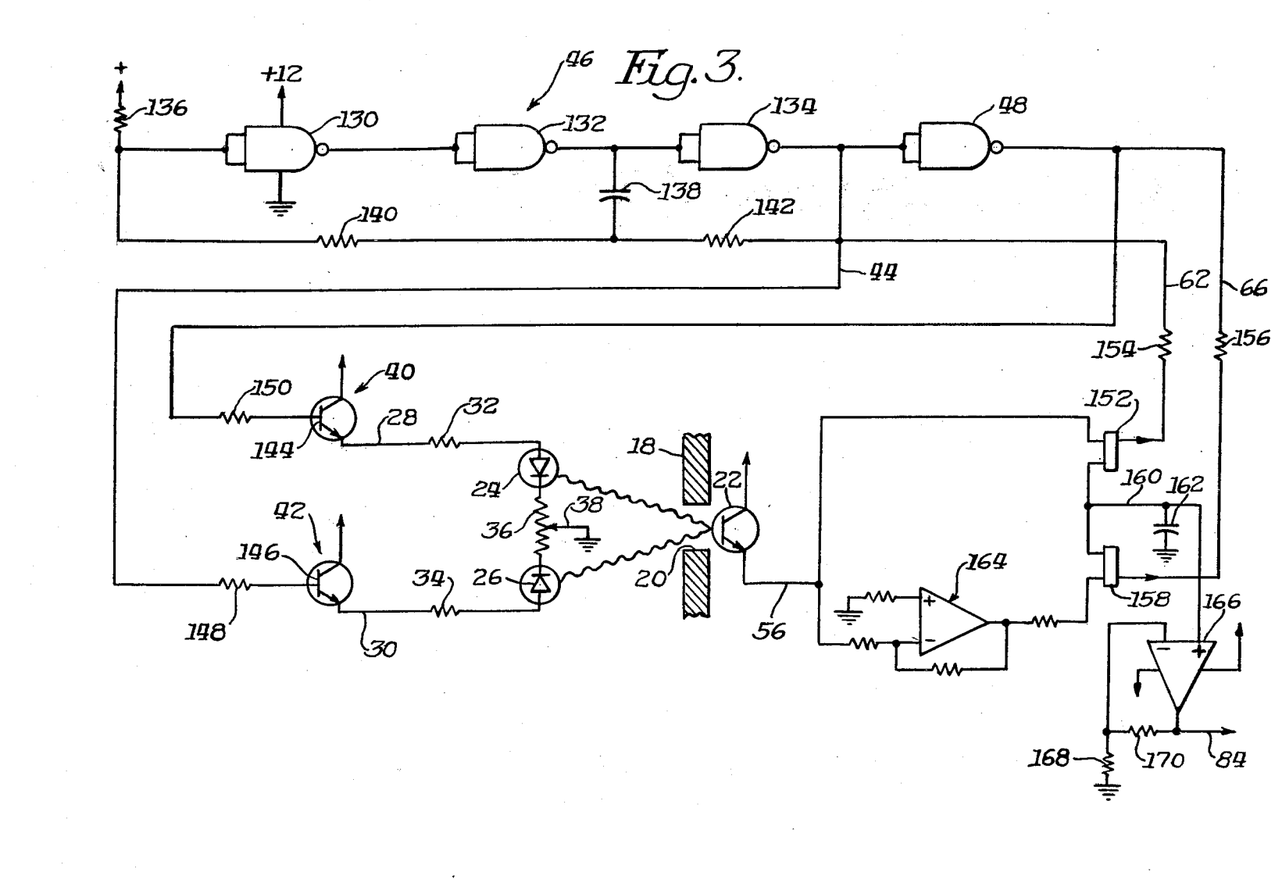
FIG. 3 is an electrical schematic and block diagram representation of an alternate embodiment of the servo control arrangement of FIG. 1.

Referring now to FIG. 3 and considering an alternate embodiment of the servo control arrangement 10 in FIG. 1 wherein like reference numerals refer to like components of FIG. 1, the oscillator stage 46 and the inverter gate 48 are implemented by a QUAD, two-input NAND gate chip. Three NAND gates 130, 132 and 134 are utilized to implement the oscillator stage 46 and the fourth NAND gate is utilized to implement the inverter gate 48. The four NAND gates 130, 132, 134 and 48 each include their respective two inputs interconnected so that the gates function as inverters. The input of the gate 130 is connected to a positive supply voltage through a resistor 136. The output of the gate 130 is connected to the input of the gate 132. The output of the gate 132 is connected to the input of the gate 134. The output of the gate 134 is connected to the input of the gate 48 and also provides the oscillator output signal 44. The output of the gate 132 is connected through the series combination of a capacitor 138 and a resistor 140 to the input of the gate 130. The output of the gate 134 is connected through a resistor 142 to the junction of the capacitor 138 and the resistor 140. The frequency of operation of oscillator 146 for initial operation in a specific embodiment in the servo control arrangement 10 is approximately 5 Khz.

The buffer stages 40 and 42 are respectively implemented by two NPN transistors 144 and 146. Specifically, the oscillator output 44 is connected through a resistor 148 to the base of the transistor 146. The collector of the transistor 146 is connected to a positive voltage supply. The emitter of the transistor 146 provides the drive output 30 to the LED source 26. Similarly, the output of the gate 48 is connected through a resistor 150 to the base of the transistor 144. The collector of the transistor 144 is connected to the positive voltage supply. The emitter of the transistor 144 provides the drive output 28 to the LED source 24.

The gate enable lead 62 from oscillator output 44 is connected to a first FET gate switch 152. Specifically, the gate lead of the FET switch 152 is connected to the signal 62 through a resistor 154. The gate enable signal 66 is connected through a resistor 156 to the gate lead of a second FET switch gate 158. The source connection of the switches 152 and 158 are interconnected to provide a net loop filter signal 160. The output 160 is connected to ground potential through a capacitor 162. The drain lead of the FET switch 152 is connected to the photodetector output 56. A buffer/inverter amplifier stage 164 is interconnected between the photodetector output 56 and the drain lead of the FET switch 158.

The net loop output signal 160 is connected to the noninverting input of an amplifier stage 166. The output of the amplifier stage 166 provides the loop drive signal 84. The inverting input of the amplifier stage 166 is connected to ground potential through a resistor 168 and is further connected to the output 84 through a resistor 170. The amplifier stage 166 is supplied by positive and negative supply voltages.

In operation, the capacitor 162 at output 160 averages the gated signals through FET switch gates 152 and 158 representing the response of the photodetector 56 to each of the alternately energized sources 24, 26. The capacitor 162 at output 160 directly averages the gated input signals to obtain a net effective loop signal via the inversion by amplifier 164 of the photodetector output 56 in response to the illumination from the source 24. Thus the amplifier 166 operates as a single-ended input as compared to the differential amplifier 78 of FIG. 1. Servo operation to appropriately center the next successive aperture 20 of the coded member 18 in the aligned position is similar to that discussed hereinbefore.

Figure 4:
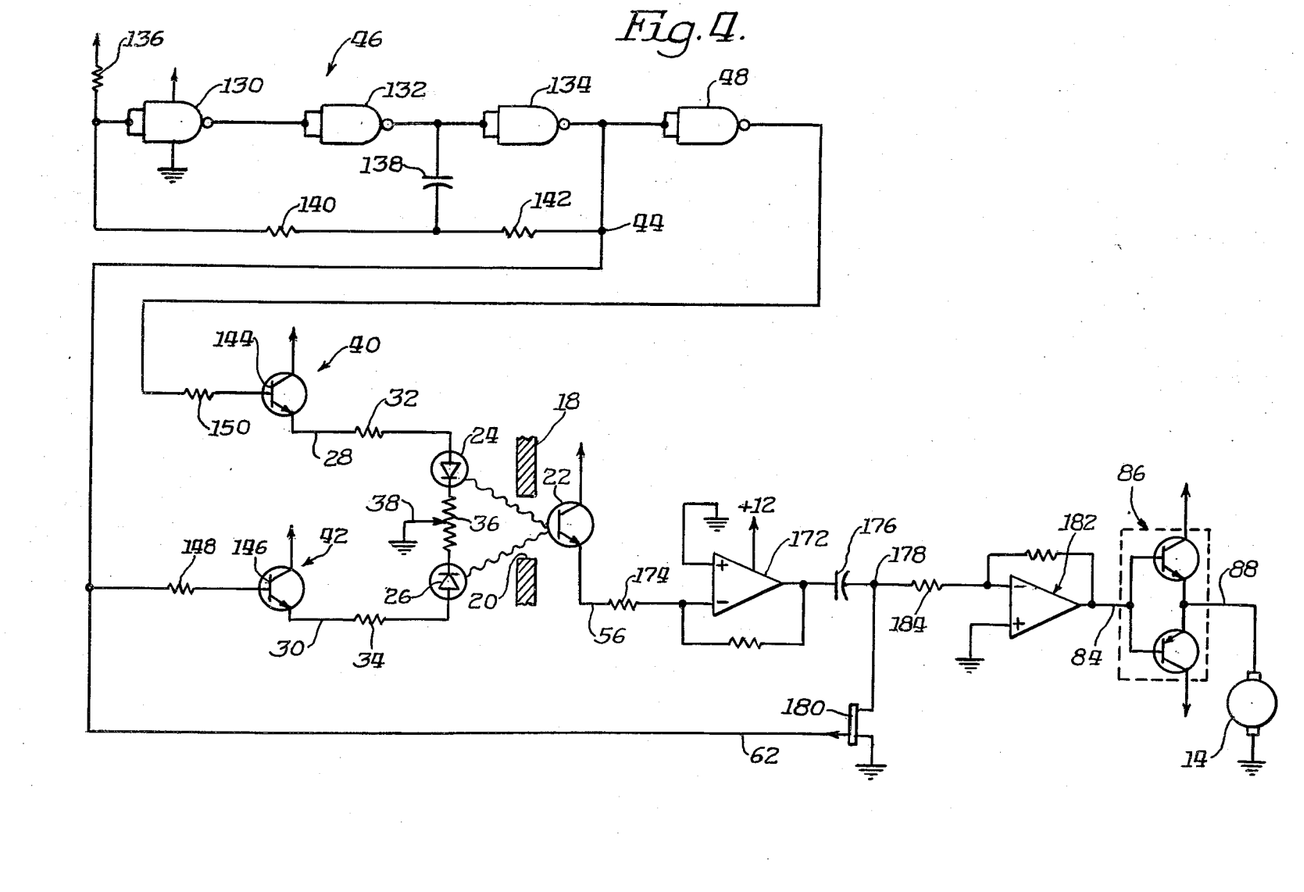
FIG. 4 is an electrical schematic and logic diagram representation of another embodiment of the servo control arrangement of FIG. 1 that is a preferred form for simplicity and implementation.

Referring now to FIG. 4, another alternate embodiment of the servo control arrangement 10 is illustrated wherein like reference numerals refer to like elements and components of FIGS. 1 through 3. In the servo control arrangement 10 of FIG. 4, the photodetector output 56 is connected to the inverting input of an amplifier stage 172 through a resistor 174. The output of the amplifier 172 is connected through a capacitor 176 to provide a servo loop control signal 178. The output 178 is connected to ground potential through the drain to source conduction path of a FET switch 180. The gate of the FET switch 180 is connected to the gate enable signal 62 from oscillator output 44. The loop output 178 is connected to an amplifier stage 182 through a resistor 184. The output of the amplifier 182 provides the loop drive signal 84 to a push-pull transistor amplifier stage functioning as the motor drive amplifier stage 86. The output of the amplifier stage 86 provides the motor control drive signal 88 to the motor 14.

In operation, when the FET switch 180 is off corresponding to a high gate enable signal 62, the LED source 26 is energized and the response of the photodetector 56 is amplified by stage 172.

When the gate enable lead 62 is low, corresponding to energization of the LED source 24, the FET switch 180 is rendered conductive and the loop output 178 is brought down to a low reference potential near the ground reference. The capacitor 176 at the output of the amplifier 172 is charged to a reference potential corresponding to the amplified photodetector output corresponding to the response of the photodetector from illumination from LED source 24. Thus, during the energization time of LED source 26, the capacitor 176 couples to the output 178, the net difference in charge levels that corresponds to the output of the photodetector 56 from the alternately energized LED sources 24, 26 to provide a single-ended loop control signal at 178. The loop control signal at 178 is processed by the amplifier stages 182 and 86 to drive the motor 14 at output 88. Other aspects of the servo control arrangement 10 of FIG. 4 are in accordance with the discussion hereinbefore with respect to FIG. 1.

For optimum operation and to minimize filtering requirements, the oscillator stage 46 in FIG. 4 is preferably arranged to energize the LED source 26 for a higher percentage of the oscillator period than LED source 24. In this manner, the LED source 24 is preferably energized for a relatively brief time duration such that the output at 84 is a substantially continuous signal level in response to the energized time of the LED source 26.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A servo control arrangement for controlling the accurate positioning of a movable controlled member to each of a predetermined plurality of controlled positions, the servo control arrangement comprising:

means responsive to a drive input signal for moving the controlled member to said plurality of controlled positions;

coded array means arranged for movement in a manner directly correlated to movement of the controlled member, said coded array means comprising an array of energy transmissive members arranged in a predetermined pattern, one of said energy transmissive members being disposed in said predetermined pattern corresponding to each of the predetermined plurality of controlled positions, movement of said coded array means resulting in said coded array describing a predetermined path, movement of said coded array means sequentially presenting each of said energy transmissive members in said predetermined pattern to a predetermined detection station;

energy generating means comprising two energy generation sources and means for alternately energizing each of said two energy generation sources at a predetermined rate, said two energy generation sources being disposed at said detection station on one side of said coded array means, said two energy generation sources being arranged side by side along said predetermined path and substantially centered about said detection station;

energy detection means responsive to said energy generation sources for generating an output signal representative of the relative level of energy received, said energy detection means being disposed at said detection station on the side of said coded array means opposite said energy generation sources and generally aligned with a line substantially perpendicular to said planar array and passing through the midpoint of said two energy generation sources such that energy generated by said energy generation sources is received by said energy detection means through one of said energy transmissive members when said energy transmissive member is within a predetermined positional range of said aligned detection position, the relative amount of energy received by said energy detection means from each of said energy generative sources being dependent on the position of said energy transmission member within said predetermined positional range;

control means responsive to said output signal of said energy detection means for controlling operation of said moving means and generating said drive input signal in accordance with the relative difference in the output of said energy detection means occurring between the respective energization times of said alternately energized sources and corresponding to the relative difference in energy received from each of said energy generative sources.

2. The servo control arrangement of claim 1 wherein said control means further comprises forced mode control means responsive to the presence of a movement control signal for generating a drive signal independent of the output of said energy detection means to move said controlled member from the present position to another position.

3. The servo control arrangement of claim 2 wherein said control means further comprises means for inhibiting the response of said control means to said output of said energy detection means whenever said movement control signal is active.

4. The servo control arrangement of claim 2 wherein said control means further comprises means responsive to said energizing of said energy detection means for terminating said drive signal whenever said movement control signal is absent and said energy detection means is energized by received energy from said energy generation sources.

5. The servo control arrangement of claim 1 or 2 wherein said energy transmission members are apertures formed in said coded array means, said energy generation sources are light emitting devices and said energy detection means is a photodetection device.

6. The servo control arrangement of claim 5 wherein said coded array means is a generally planar member having a circular perimeter, said moving means comprising a rotating member.

7. The servo control arrangement of claim 5 wherein said control means further comprises gating means responsive to said output signal of said energy detection means and said alternately energizing means for providing first and second outputs proportional to said output signal of said energy detection means, said first output being active during the energization time of one of said light emitting devices and said second output being active during the energization time of said second light emitting device.

8. The servo control arrangement of claim 7 wherein said control means further comprises differential amplifier means having a first input connected to said first output of said gating means and a second input connected to said second output of said gating means, said differential amplifier means generating said drive signal in accordance with the difference between the signals on said first and second inputs.

9. The servo control arrangement of claim 6 wherein said rotary member of said moving means comprises slide tray turntable means for carrying a slide tray having a plurality of slide positions corresponding to said controlled positions.

10. The servo control arrangement of claim 6 wherein said array of apertures form a circumferential ring pattern, said coded array means being carried by said slide tray turntable means.

11. The servo control arrangement of claim 7 wherein said control means further comprises sample and hold storage means controlled to said first and second outputs of said gating means for storing the signal levels on each of said respective outputs during the times said respective gating means outputs are not active.

12. The servo control arrangement of claim 5 wherein said control means comprises relative difference determining means responsive to said output of said photodetector device for providing an output signal representing the relative difference between the signal levels on said output of said photodetector device corresponding to the signal levels resulting during the respective energization times of said light emitting devices.

13. The servo control arrangement of claim 12 wherein said relative difference determining means comprises a capacitor connected in series with said output of said photodetector device and said output of said relative difference determining means, and gate means connected to said output of said relative difference determining means and being responsive to said alternately energizing means for establishing a reference level at said output of said relative difference determining means during the time of energization of one of said light emitting devices.

14. The servo control arrangement of claim 13 wherein said capacitor of said relative difference determining means during said time to energization of said second of said light emitting devices provides a signal at said output of said relative difference developing means equal to the difference between said output levels of said photodetector device during said respective energization times of said first and second light emitting devices.

15. A feedback detection system for a servo circuit comprising:
alternately energized illumination source means comprising two illumination source devices and means for alternately energizing said illumination source devices;
illumination responsive detection means for generating an output signal in response to the illumination levels received from said alternately energized illumination source devices; and
a movable coded aperture member having an array of coded apertures disposed thereon, one of said apertures corresponding to each controlled position of a controlled member that is movable with said coded aperture member, said coded aperture member being disposed between said illumination source devices and said illumination responsive detection means, said array of coded apertures being disposed around a circumferential ring of said coded aperture member, said illumination source devices and said illumination responsive detection means being disposed such that each of said apertures is moved into alignment with said illumination sources devices and said illumination responsive detection means at a respective predetermined position of rotation of said coded aperture member.

16. A method for providing feedback signals to a servo loop for controlling the position of a movable controlled member to one of a plurality of controlled positions, the method comprising the steps of:
alternately energizing a pair of illumination source devices;
disposing a movable coded aperture member having an array of apertures adjacent said illumination source devices, said aperture array presenting each of said apertures to said illumination source devices as said coded aperture member is moved along a predetermined path;
positioning a photodetector device opposite said illumination source devices with said coded aperture member disposed intermediate said illumination source devices and said photodetector device;
providing the relative difference between the output signal level states of the photodetector device occurring in response to the illumination levels received from said alternately energized illumination source devices; and
developing a loop control signal based on the relative difference between said signal level states of said photodetector device as said coded aperture member is moved along said predetermined path.

* * * * *

UNITED STATES PATENT AND TRADEMARK OFFICE
CERTIFICATE OF CORRECTION

PATENT NO. : 4,422,026

DATED : December 20, 1983

INVENTOR(S) : Rudolph Starai

It is certified that error appears in the above-identified patent and that said Letters Patent are hereby corrected as shown below:

Column 1, line 54, change "source" to "sources";

Column 1, line 56, correct spelling of "feedback";

Column 1, line 64, delete "drain", and insert --drive--;

Column 2, line 44, after "another", insert --alternate--;

Column 3, line 48, change "cathode" to "cathodes", and change "device" to "devices";

Column 3, line 52, change "device" to "devices";

Column 4, line 49, after "to", insert --a--; and

Column 8, line 21, correct spelling of "resistor".

IN THE CLAIMS:

In Claim 1, line 48, after "range;", insert --and--;

In Claim 11, line 3, after "means", delete "controlled" and insert --connected--;

In Claim 13, line 1, after "12", insert --further comprising--;

In Claim 13, lines 2 and 3, delete "wherein said relative difference determining means comprises";

UNITED STATES PATENT AND TRADEMARK OFFICE
CERTIFICATE OF CORRECTION

PATENT NO. : 4,422,026
DATED : December 20, 1983
INVENTOR(S) : Rudolph Starai

It is certified that error appears in the above-identified patent and that said Letters Patent are hereby corrected as shown below:

In Claim 13, line 3, after "capacitor", insert --having one end--;

In Claim 13, line 3, after "connected", insert --to--;

In Claim 13, lines 3 and 4, delete "in series with said output of said photodetector device and";

In Claim 13, line 6, after "said" (first occurrence), insert --second end of said capacitor--;

In Claim 13, lines 6 and 7, delete "output of said relative difference determining means";

In Claim 13, line 9, after "said" (first occurrence), insert --second end of said capacitor--;

In Claim 13, lines 9 and 10, delete "output of said relative difference determining means";

UNITED STATES PATENT AND TRADEMARK OFFICE
CERTIFICATE OF CORRECTION

PATENT NO. : 4,422,026
DATED : December 20, 1983
INVENTOR(S) : Rudolph Starai

It is certified that error appears in the above–identified patent and that said Letters Patent are hereby corrected as shown below:

In Claim 15, line 23, change "sources" to "source".

Signed and Sealed this

Twentieth Day of November 1984

[SEAL]

Attest:

*Attesting Officer*

GERALD J. MOSSINGHOFF

*Commissioner of Patents and Trademarks*

UNITED STATES PATENT AND TRADEMARK OFFICE
CERTIFICATE OF CORRECTION

PATENT NO. : 4,422,026
DATED : December 20, 1983
INVENTOR(S) : Rudolph Starai

It is certified that error appears in the above-identified patent and that said Letters Patent are hereby corrected as shown below:

IN THE CLAIMS:

In Claim 14, lines 2 and 3, delete "of said relative difference determining means";

In Claim 14, line 3, delete "to", and insert --of--;

In Claim 14, line 5, after "said" (first occurrence), insert --second end of said capacitor--; and In Claim 14, line 5, delete "output of said relative difference developing means".

Signed and Sealed this

Fifth Day of March 1985

[SEAL]

Attest:

DONALD J. QUIGG

Attesting Officer

Acting Commissioner of Patents and Trademarks